United States Patent [19]

Matsuo et al.

[11] Patent Number: 5,696,608
[45] Date of Patent: Dec. 9, 1997

[54] IMAGE READING APPARATUS CAPABLE OF CONTROLLING LIGHT EMISSION AMOUNT

[75] Inventors: Takayuki Matsuo; Kiyohisa Sugishima, both of Yokohama, Japan

[73] Assignee: Canon Kabushiki Kaisha, Tokyo, Japan

[21] Appl. No.: 52,383

[22] Filed: Apr. 19, 1993

[30] Foreign Application Priority Data

Apr. 20, 1992 [JP] Japan ................ 4-099742

[51] Int. Cl.[6] .................. H04N 1/04; H04N 1/46
[52] U.S. Cl. .................. 358/475; 358/406; 358/446; 358/504; 358/509
[58] Field of Search .................. 358/461, 475, 358/406, 482, 483, 446, 447, 501, 504, 505, 509

[56] References Cited

U.S. PATENT DOCUMENTS

| | | | |
|---|---|---|---|
| 4,408,231 | 10/1983 | Bushaw et al. | 358/280 |
| 4,891,692 | 1/1990 | Outa | 358/500 |
| 4,922,335 | 5/1990 | Outa et al. | 358/475 |
| 4,972,068 | 11/1990 | Ohtani et al. | 235/75 |
| 4,979,032 | 12/1990 | Alessi et al. | 358/527 |
| 5,084,772 | 1/1992 | Shimoyama | 358/475 |
| 5,155,596 | 10/1992 | Kurtz et al. | 358/214 |
| 5,196,948 | 3/1993 | Kasahara et al. | 358/446 |
| 5,296,944 | 3/1994 | Suzuki et al. | 358/475 |

*Primary Examiner*—Thomas D. Lee
*Attorney, Agent, or Firm*—Fitzpatrick, Cella, Harper & Scinto

[57] ABSTRACT

An image reading apparatus has a projecting light source and a photo-sensitive device for receiving the projected light. In addition, a device is provided for measuring characteristics of the image reading apparatus while changing a light emission amount from the light source on the basis of an instruction by the user.

15 Claims, 7 Drawing Sheets

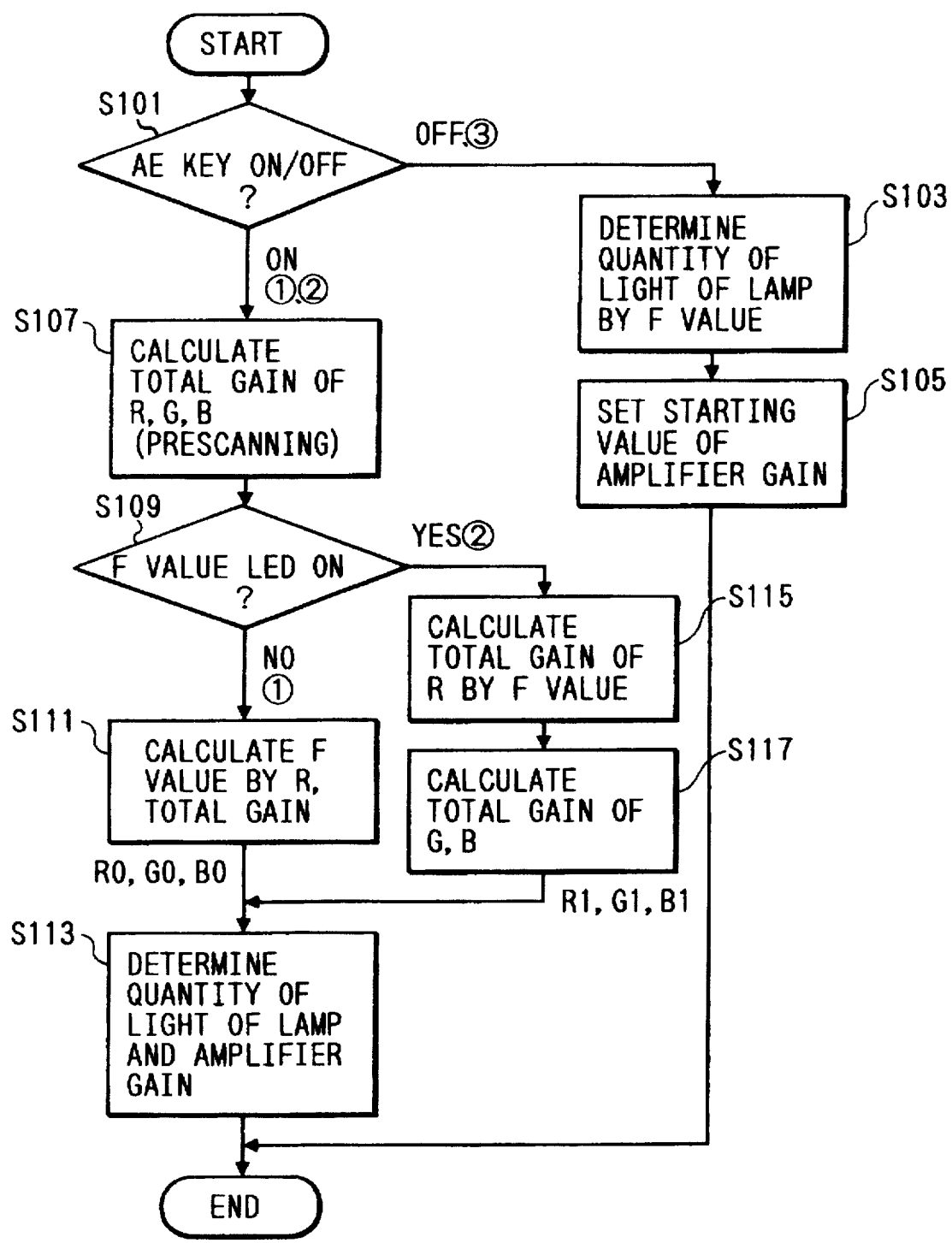

IMAGE READING APPARATUS CAPABLE OF CONTROLLING LIGHT EMISSION AMOUNT

BACKGROUND OF THE INVENTION

1. Field of the Invention

The present invention relates to an image reading apparatus having a projecting light source and a photo sensitive device to receive the projected light.

2. Related Background Art

There are a film projector and a copying apparatus having a construction such that a film projector having a halogen lamp as a projecting light source is installed over an original supporting glass, a film as an original is set to a film carriage, the lamp is lit on, the image on the film is projected onto a Fresnel lens, the projected image is scanned by a photosensitive device from the back side (side opposite to the side on which the projector is located) of the original supporting glass, and the image of the film is converted into the electric signal. In such a film projector or copying apparatus, the images recorded on the film are different in dependence on the kind of film which is used, characteristics thereof, conditions when the images have been photographed, and bleaching. Therefore, in order to properly reproduce the color, a quantity of light of a lamp of the projector and parameters (for example, an amplification ratio of an amplifier to amplify the signal) in the copying apparatus are adjusted every projected image and the scanning and recording operations of the image are executed.

The reasons why it is necessary to adjust the light quantity of the lamp and the parameters for the image processings in the copying apparatus are as follows.

That is, a dynamic range of the density of an image which is formed on the film is wider than a dynamic range of the sensitivity of the foregoing photo sensitive device. In order to reduce deterioration in picture quality due to such a difference of the dynamic ranges, the light quantity of the lamp to project the film is also controlled.

The above technique has been disclosed in U.S. Pat. No. 4,891,692 by the same assignee as the applicant of the present invention.

There is also a technique such that a density of an image which is projected from a film is sampled in every color, a histogram of the densities is formed, and a total gain for the film, namely, a combination of the light quantity of the lamp to expose the film and an amplification ratio of the amplifier to amplify an electric signal from the photo sensitive device is determined on the basis of such a histogram. Such a technique has also been filed by the same assignee as the present applicant.

In the above conventional apparatus, there are factors of a large individual difference such as characteristics of the lamp itself, output characteristics of a power supply circuit to light on the lamp, output characteristics of the photosensitive device, and the like. Therefore, even when the representative values of the respective characteristics of a plurality of projectors and the representative values of the respective characteristics of a plurality of copying apparatuses are used for control, the image which is finally obtained deteriorates due to an influence of the individual differences mentioned above. Therefore, the characteristics of the projector and the copying apparatus have previously been measured upon manufacturing, the results are stored in a memory in the copying apparatus, and the stored data is read out from the memory as necessary and is used for control. Such a method can be used, for example, in case of adjusting those characteristics in the assembling factory or the like of the copying apparatus because a set formed by a projector and a copying apparatus which should be combined has been predetermined. However, in the case where the projector is exchanged in the market or in the case where the lamp of the projector is exchanged, the picture quality deteriorates so long as the characteristics held in the memory in the factory are used. As will be explained hereinlater, one of the reasons for such deterioration of the picture quality is that, for instance, the color balance is broken due to a change in light quantity of the lamp of the projector. Such a problem of the deterioration of the picture quality is large, particularly in case of a type such that the projector and the copying apparatus are connected by a detachable interface cable. Namely, this is because there is a possibility such that the user freely combines a plurality of projectors and a plurality of copying apparatuses.

SUMMARY OF THE INVENTION

In consideration of the above problems, it is an object of the present invention to provide an image reading apparatus which can obtain a high picture quality.

Another object of the invention is to provide an image reading apparatus which can reduce deterioration of the picture quality even for an aging change.

Still another object of the invention is to provide an image reading apparatus which can read an image at a high speed.

Under such objects, according to a preferred embodiment of the present invention, there is disclosed an apparatus comprising a light source to illuminate a target image, means for generating a control signal to control a light emission amount of the light source, and means for measuring and holding a relation between the control signal and a light emission amount of a light emitted from the light source in accordance with an instruction by the user.

The above and other objects and features of the present invention will become apparent from the following detailed description and the appended claims with reference to the accompanying drawings.

BRIEF DESCRIPTION OF THE DRAWINGS

FIG. 9 is a flowchart showing the operation of the first embodiment.

DETAILED DESCRIPTION OF THE PREFERRED EMBODIMENTS

Figure 1:
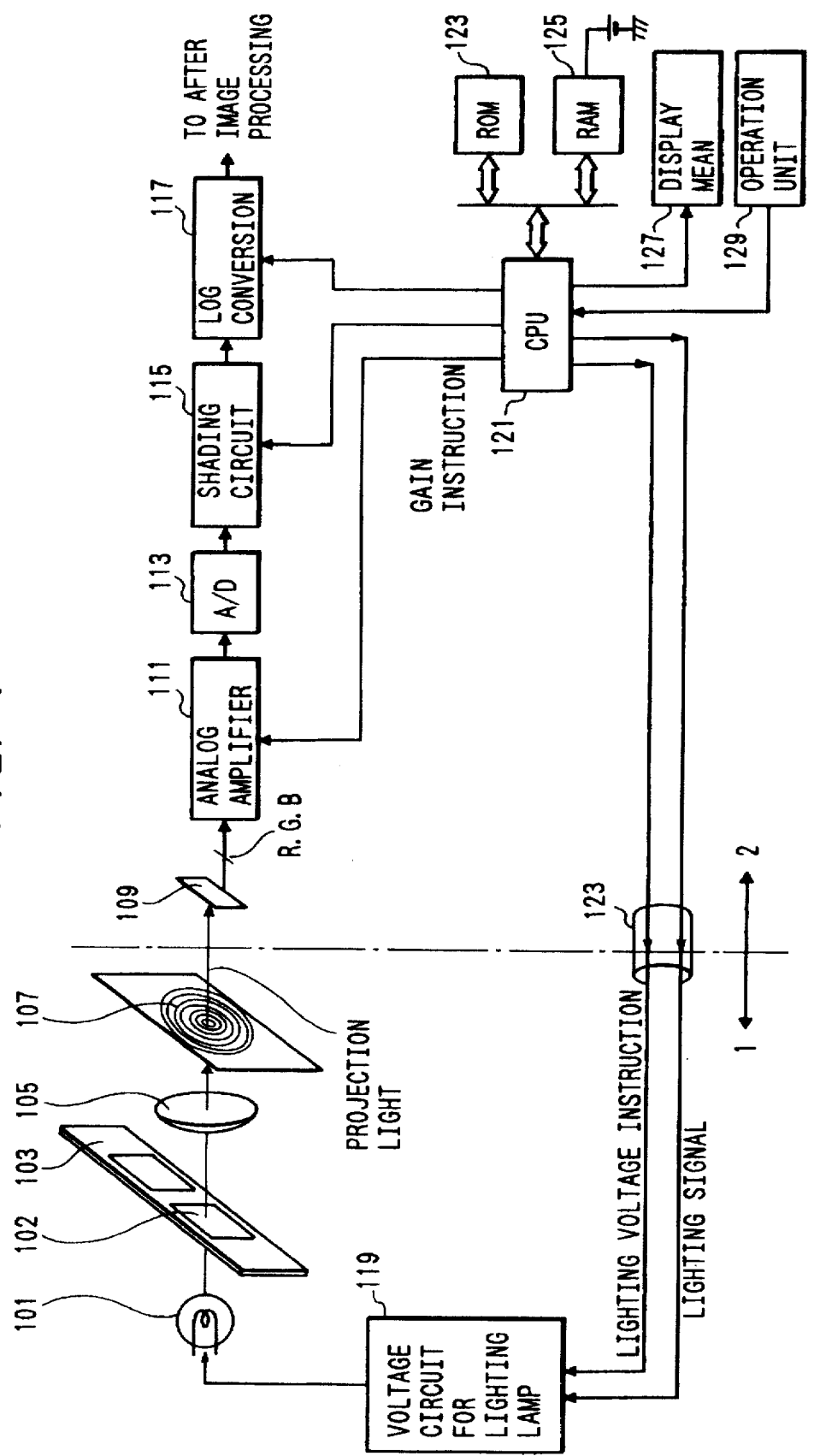
FIG. 1 is a constructional diagram of an image reading apparatus according to an embodiment of the present invention.
Figure 2:
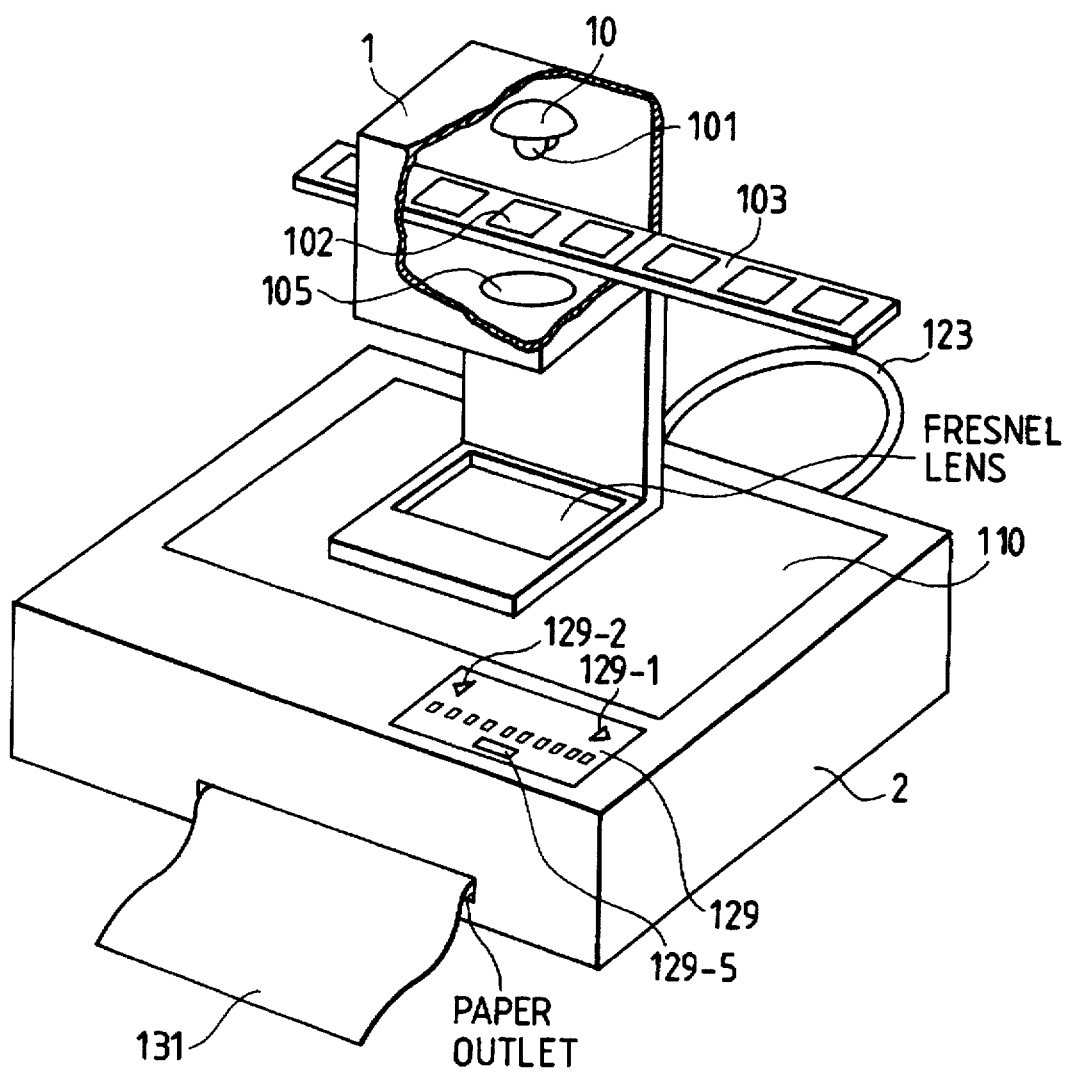
FIG. 2 is a perspective view of the image reading apparatus of FIG. 1.

FIG. 1 is a diagram showing constructions of a copying apparatus and a projector according to an embodiment of the present invention. FIG. 2 is a perspective view showing such an embodiment. In FIG. 1, reference numeral 101 denotes a halogen lamp; 102 a film; 103 a film carriage to hold the film 102; 105 a projecting lens; 107 a Fresnel lens; 109 a photo sensitive device of the copying apparatus main body; 110 an original supporting glass; 111 an analog amplifier which can vary a gain on the basis of a gain instruction from a CPU 121; 113 an A/D converter; 115 a shading circuit having therein a RAM for shading correction, a digital multiplier for shading correction, and the like; 117 a LOG conversion circuit; and 119 a voltage circuit to light up a lamp. A lighting voltage of the lamp changes on the basis of a lighting voltage instruction from the CPU 121. Reference numeral 121 denotes the CPU; 123 a ROM in which programs which are executed by the CPU 121 and will be explained hereinlater are stored; 125 a RAM in which characteristics data in FIGS. 6 and 7, which will be explained hereinlater, is stored; 127 display means of the copying apparatus; and 129 an operation unit of the copying apparatus. The operation unit 129 has keys 129-1 and 129-2 for setting an F value and a key 129-5 for setting AE. In the case where the user of the apparatus uses the copying apparatus and a projector which is combined thereto for the first time, he instructs a characteristics measurement mode from the operation unit 129 only once.

The operation of the embodiment according to the present invention will now be described hereinbelow.

A control method in the embodiment will now be described with reference to FIGS. 8 and 9.

Figure 8:
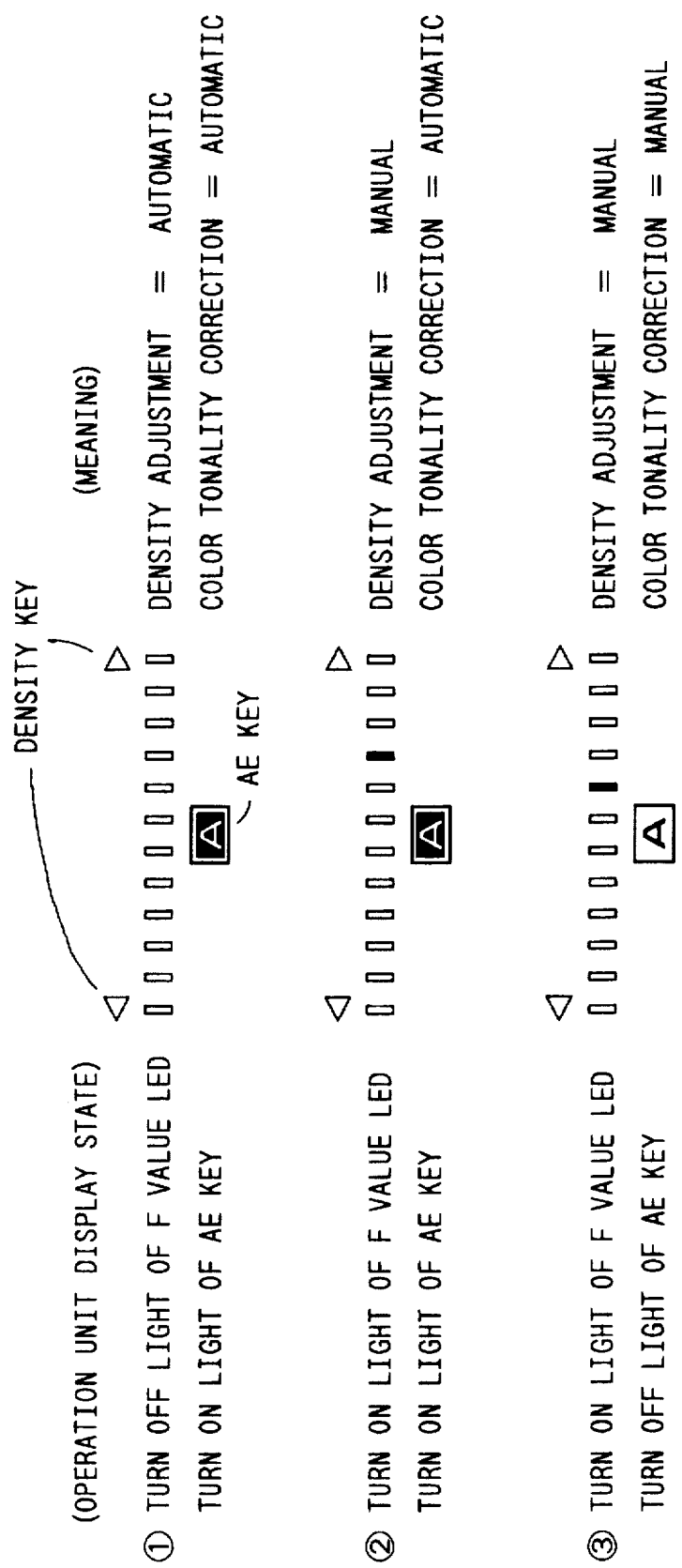
FIG. 8 is a diagram showing an operation unit in the first embodiment.

① to ③ in FIG. 8 are diagrams showing operating states of the operation unit 129.

① State in which the density adjustment is set to an automatic adjusting state and the color tonality is set to an automatic adjusting state.

② State in which the density adjustment is set to a manual adjusting state and the color tonality correction is set to an automatic adjusting state.

③ State in which the density adjustment is set to a manual adjusting state and the color tonality correction is set to a manual adjusting state.

When none of the keys 129-1 and 129-2 for setting the F value is operated, the density adjustment is set to the automatic adjusting state. When the keys 129-1 and/or 129-2 are/is operated, the manual adjusting state is set. When the key 129-5 for AE setting is turned on, the color tonality correction is set to the automatic adjusting state. When the key 129-5 is not turned on, the color tonality correction is set to the manual adjusting state.

FIG. 9 is a diagram showing a control flow in the embodiment. In FIG. 9, a check is first made to see if the AE setting key 129-5 has been turned on or off (step S101). When the key 129-5 is OFF, a lighting voltage instruction is generated (S103) so as to control the light quantity of the lamp 101 so as to emit the light of a light quantity determined in accordance with the set density adjusting state. The gain of the amplifier according to such a lamp light quantity is set (S105).

When the AE setting key 129-5 is ON, the film 102 is pre-scanned and a histogram of each level of the R, G, and B components is formed and a total gain indicative of the product of the lamp light quantity and the amplifier gain is calculated (S107).

Subsequently, a check is made to see if the density adjustment has been set to the automatic adjusting state or not (S109). When the automatic density adjusting state is set, the F value to be displayed in the operation unit 129 is calculated from the total gain of R (S111). An optimum set of the lamp light quantity and amplifier gain to realize the total gain for the components of $R_0$, $G_0$, and $B_0$ obtained in step S107 is determined (S113).

Figure 6:
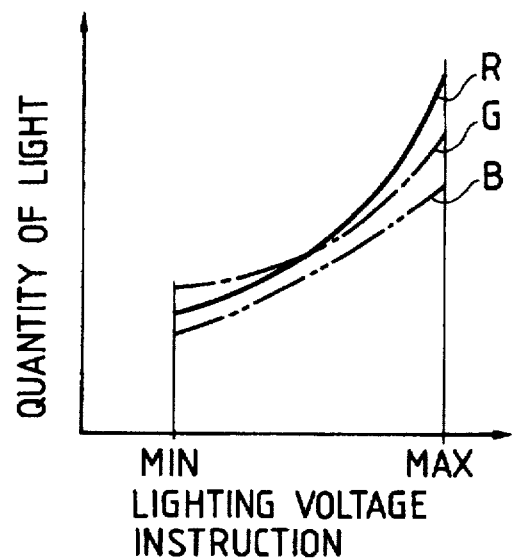
FIG. 6 is a characteristic diagram showing the relation between the lighting voltage instruction of a light source lamp and the corresponding light quantity.
Figure 7:
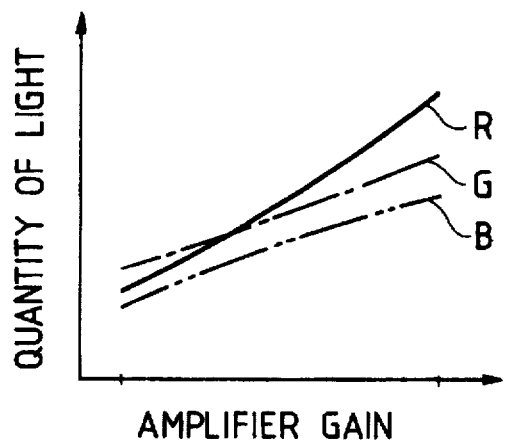
FIG. 7 is a characteristic diagram showing the relation between the gain of an analog amplifier and the light quantity.

Such an optimum set of the lamp light quantity and amplifier gain is decided in accordance with the characteristics of FIGS. 6 and 7.

In step S109, when the density adjustment is not set to the automatic adjusting state, the total gain $R_0$ for the R component calculated in step S107 is corrected on the basis of the set F value (S115) and $R_1$ is obtained. Total gains $G_1$ and $B_1$ for the G and B components are calculated as follows (S117).

$$G_1 = G_0 \times \frac{R_1}{R_0}$$

$$B_1 = B_0 \times \frac{R_1}{R_0}$$

On the basis of the calculated total gain, the lamp light quantity and the amplifier gain for each color component are determined.

In the embodiment, in the case where the AE key has been turned on as mentioned above, on the basis of the calculated total gain, a set of the lighting voltage to control the lamp light quantity and the amplifier gain is determined together. However, after the lighting voltage and the amplifier gain were set in order to control such a lamp light quantity, an actual degree of light quantity or amplifier gain is not detected. Therefore, in the copying apparatus of the embodiment, the characteristics of FIGS. 6 and 7 are measured in accordance with an instruction.

In this instance, the light quantity characteristics of the halogen lamp, gain of the analog amplifier, and the like are measured as shown below.

The light quantity of the halogen lamp can be adjusted by changing the lighting voltage of the lamp. For example, as shown in FIG. 7, there is generally a non-linear relation between the lighting voltage instruction (lighting voltage is linear to the lighting voltage instruction) of the lamp and the light quantity. The color balance of RGB also differs. On the other hand, although the input/output characteristics of the analog amplifier are fundamentally linear. As shown in FIG. 7, however, such input/output characteristics generally show a non-linearity in both of the high and low gain portions. Further, since special analog amplifiers are used for R, G, and B, the characteristics of those color components also differ. Consequently, before the projector is used, the copying apparatus changes the lighting voltage by the voltage circuit 119 only once. Further, the characteristics shown in FIGS. 6 and 7 are measured while changing the amplifier gain. A conversion table is previously stored in a memory to correct the characteristics on the basis of the results of the measurement. By referring to such a conversion table as necessary, control parameters (lamp lighting voltage instruction, analog amplifier gain, logarithm conversion table shift amount) are obtained and stored into the RAM 125.

After that, the control parameters are continuously held until the user instructs the measurement of the characteristics because the projector is changed or there is a necessity to change the lamp, photo sensitive device, or the like.

Figure 3:
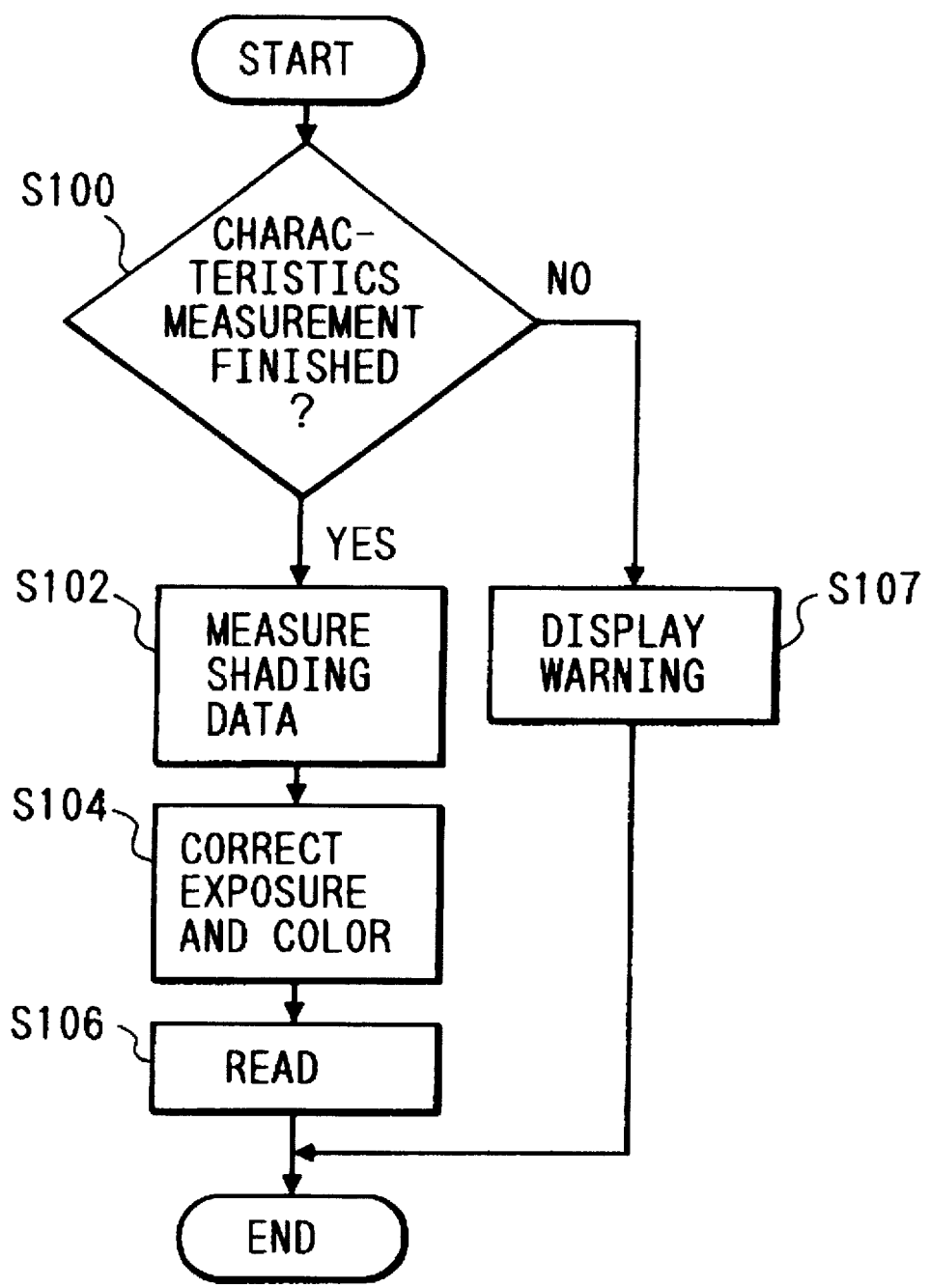
FIG. 3 is a flowchart for the image reading operation in the first embodiment.

FIG. 3 shows a flowchart for processings in the case where the projected image from the projector is read by the copying apparatus. On the copying apparatus side, the above characteristics are measured and information indicating whether those characteristics have been held in the memory or not is stored in the memory. Such an information is checked prior to the reading operation (S100). As a result of the check, when the characteristics are not yet measured, such a fact is displayed by the display means as a warning and the reading operation is stopped (S107). When the characteristics have already been measured, data for shading correction is sampled (S102) and stored into a shading memory. After that, the shading processed image data is derived. After completion of the sampling operation of the shading data, an exposure color correction processing (S104) is executed. Finally, the projected image is sequentially scanned by the photo sensitive device (S106).

Figure 4:
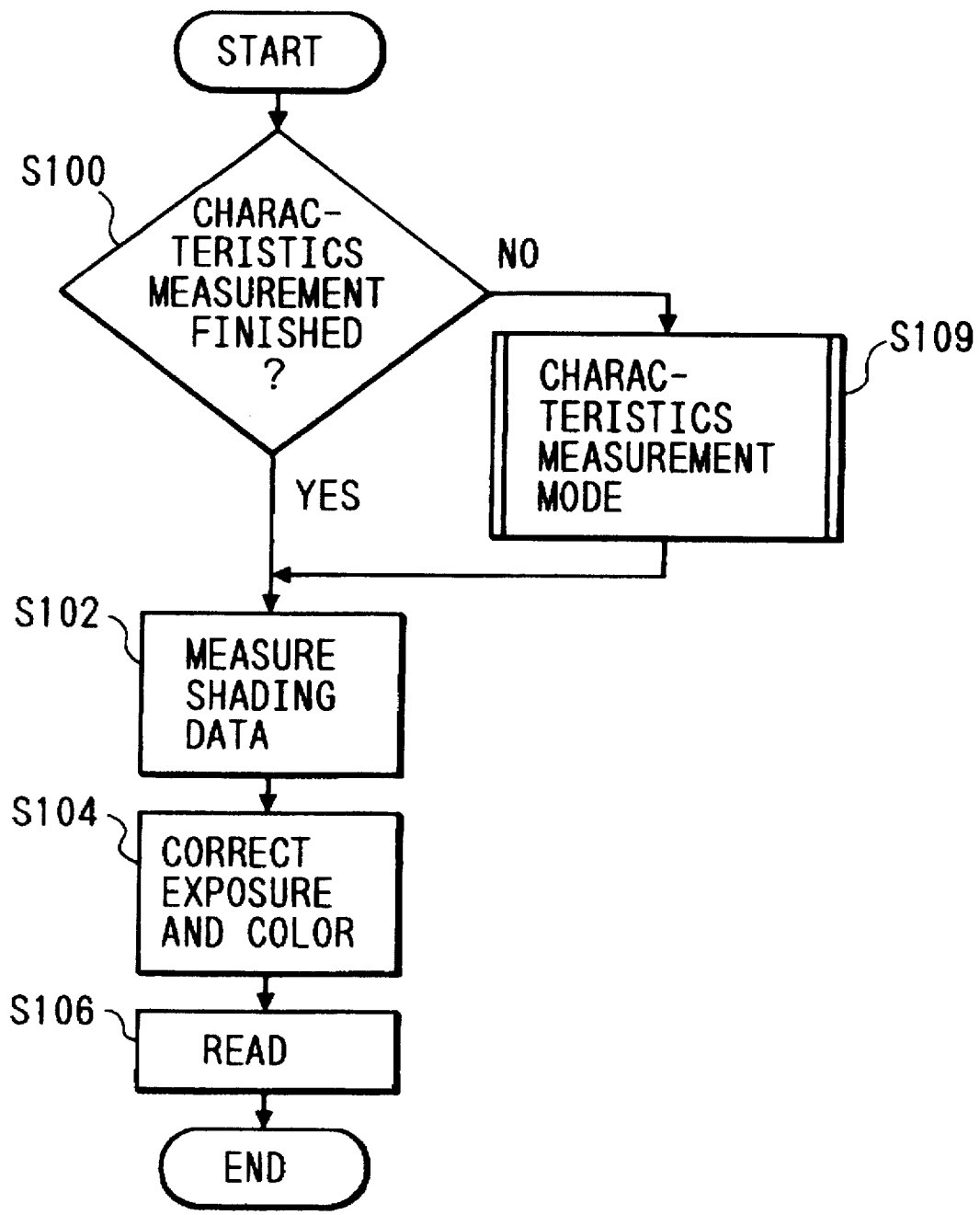
FIG. 4 is a flowchart for the image reading operation in the second embodiment.
Figure 5:
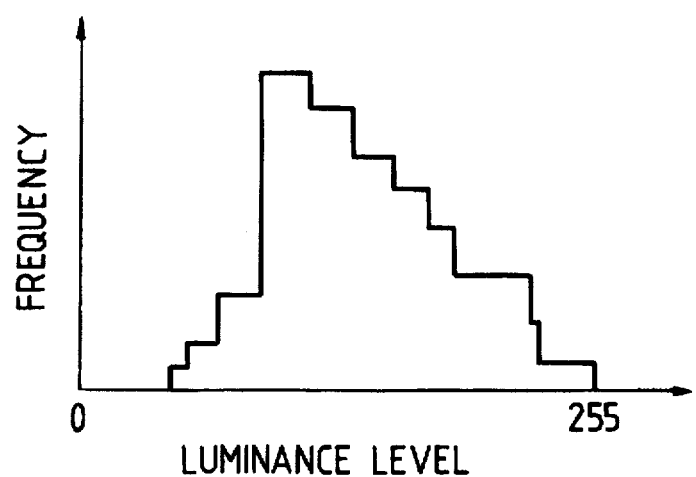
FIG. 5 is a histogram which is obtained by pre-scanning a projected image.

Specifically speaking, as shown in FIG. 4, prior to scanning the projected image for recording, an "exposure color correction" processing shown in FIG. 5 is executed. In such a processing, a part of the projected image is pre-scanned and a histogram of the read image data as shown in FIG. 5 is formed. On the basis of the histogram, a feature of the original image is extracted. How many times (referred to as a total gain), the output is increased every R, G, and B which is derived in the main scan for the sensor output of each color of R, G, and B at the time point of the execution of the pre-scan is calculated. The calculated value is distributed to the lamp output light quantity, amplification ratio of the analog amplifier, and coefficients upon logarithm conversion. Since the total gain is given by a form of "light quantity magnification", all of the lamp output light quantity, amplification ratio of the analog amplifier, and coefficients upon logarithm conversion are converted into specific control targets to amplify the "light quantity" to a desired magnification. Practically speaking, the lighting voltage instruction of the halogen lamp of the projector, the output data from the photo-sensitive device in the copying apparatus, and the offset for the input data of a logarithm conversion table in the memory which is used for logarithm conversion are adjusted.

(Other embodiments)

In the first embodiment, the characteristics measuring mode is not executed so long as the user doesn't instruct from the operation unit. However, the second embodiment shown in FIG. 4 is constructed in a manner such that at a time point when it is found out that the characteristics measurement is not executed, a warning is not displayed but the characteristics measuring mode is automatically executed as shown in the flowchart of FIG. 3.

That is, since the user operated the copying apparatus in order to use the projector, the characteristics measurement is automatically started as shown in step S109 in FIG. 4 without displaying a warning rather than the operation is instructed to the user by displaying a warning. Due to this, the operating efficiency for the user can be improved.

In the first and second embodiments, the above characteristics measurement is executed in the case where the projector and the copying apparatus are combined for the first time or in the case where some parts regarding the characteristics of the lamp or the like are exchanged. However, even after the characteristics were once measured, there is a possibility such that the characteristics change with the elapse of time. In the first and second embodiments, there is a possibility such that in spite of the fact that the characteristics changed, no warning is generated and the correction is not correctly executed and the exposure color tonality or the like is instead lost. Therefore, in the third embodiment, it is also possible to construct in a manner such that a few lighting voltage instructions of the lamp are generated (for example, a case of the maximum voltage and a case of the minimum voltage) are generated periodically or during the reading operation of the projected image. Light quantities in this instance are detected and a check is made to see if the detected light amount exceeds a predetermined allowable aging change amount or not by comparing with the characteristics stored in the memory. Thus, when it exceeds the allowable aging change amount, a warning is given to the user or the characteristics measuring mode is automatically executed before the next reading operation is performed. Checking processes as mentioned above can be also applied to the aging change of the gain characteristics of the analog amplifier.

Although the embodiments have been described with respect to the film projector and the copying apparatus as an example, the present invention is not limited to such an example. The invention can be also similarly applied to any apparatus merely having an reading function.

According to the embodiments, in the image reading apparatus having a device whose characteristics vary, the proper color tonality correction can be performed.

What is claimed is:

1. An apparatus comprising:

a light source to illuminate a target image;

means for generating a control signal to control light emission characteristics output by said light source;

measuring means for measuring a relationship between the control signal and the light emission characteristics;

holding means for holding a plurality of parameters based on a plurality of relationships between the control signal and the light emission characteristics and control means for controlling said measuring means to perform the measuring operation and for renewing the plurality of parameters held by said holding means.

2. An apparatus according to claim 1, wherein said light source is a halogen lamp.

3. An apparatus according to claim 1, further comprising photoelectric converting means for photoelectrically converting radiation from the target image.

4. An apparatus according to claim 1, wherein said light source is exchangeable.

5. An apparatus according to claim 1, wherein said holding means includes a RAM with a back-up memory.

6. An image reading apparatus comprising:

illuminating means for illuminating a target image;

photo-electrical converting means for photo-electrically converting radiation from the target image illuminated by said illuminating means;

amplifying means for amplifying an output of said photo-electrical converting means;

measuring means for measuring illuminating characteristics of said illuminating means;

holding means for holding a plurality of parameters based on a plurality of illuminating characteristics;

means for controlling said amplifying means in accordance with one of the plurality of illuminating characteristics held by said holding means; and means for controlling said measuring means to perform the measuring operation and for renewing the plurality of parameters held by said holding means.

7. An apparatus according to claim 6, wherein said illuminating means is a halogen lamp.

8. An apparatus according to claim 6, wherein said illuminating means is exchangeable.

9. An apparatus according to claim 6, wherein said holding means includes a RAM with a back-up memory.

10. An image reading apparatus comprising:

illuminating means for illuminating a target image;

means for measuring and photo-electrically converting radiation from the target image illuminated by said illuminating means;

measuring means for measuring illuminating characteristics of said illuminating means while changing an illumination light quantity;

holding means for holding a plurality of relationships between the illuminating characteristics measured by said measuring means and the illumination light quantity based on the illuminating characteristics; and control means for controlling said measuring means to perform the measuring operation and for renewing the plurality of relationships held by said holding means.

11. An apparatus according to claim 10, further comprising means for warning the user when data indicative of the illuminating characteristics has not been held by said holding means.

12. An apparatus according to claim 11, further comprising activating means for activating said measuring means.

13. An apparatus according to claim 12, wherein said activating means activates the measuring means in accordance with a state of said holding means.

14. An apparatus according to claim 10, further comprising activating means for activating said measuring means.

15. An apparatus according to claim 14, wherein said activating means activates in accordance with a manual operation.

* * * * *